United States Patent [19]
Miyazaki et al.

[11] Patent Number: 5,503,346
[45] Date of Patent: Apr. 2, 1996

[54] FISHING REEL

[75] Inventors: Takeo Miyazaki; Tomohiro Murayama, both of Tokyo, Japan

[73] Assignee: Daiwa Seiko, Inc., Tokyo, Japan

[21] Appl. No.: 332,149

[22] Filed: Oct. 31, 1994

Related U.S. Application Data

[63] Continuation of Ser. No. 63,703, May 20, 1993, Pat. No. 5,393,006.

[30] Foreign Application Priority Data

May 28, 1992 [JP] Japan .................................. 4-42655

[51] Int. Cl.$^6$ .............................................. A01K 89/033
[52] U.S. Cl. .......................... 242/295; 242/263; 242/303; 242/317
[58] Field of Search ...................... 242/285, 295, 242/302, 317, 318, 263

[56] References Cited

U.S. PATENT DOCUMENTS

| | | | |
|---|---|---|---|
| 481,743 | 8/1892 | Borchardt | 242/263 |
| 734,959 | 7/1903 | Rockwell | 242/295 |
| 783,842 | 2/1905 | Kramer | 242/295 |
| 4,796,831 | 1/1989 | Sheppard | 242/263 |
| 5,161,750 | 11/1992 | Hitomi | 242/285 |
| 5,393,006 | 2/1995 | Miyazaki et al. | 242/295 |

*Primary Examiner*—Katherine Matecki
*Attorney, Agent, or Firm*—Longacre & White

[57] ABSTRACT

A spool shaft is secured to the body of the fishing reel at the center thereof by press-fitting or the like, and projects from the body. The swing member is supported by the shaft so that the member is swingable between first and second positions. A spool is rotatably fitted on the shaft. A spring is strung between the long restriction arm of the swing member in a direction opposite a pin implanted in the body, and urges the member to put the arm in the second position, to restrict the swinging of the swing member. An intermediate gear is rotatably fitted on a shaft secured to the other arm of the swing member, and is always engaged with a drive gear provided on the spool. A drag gear is provided near the intermediate gear so that the latter can be engaged with the former when the swing member is in the second position. A swing member can be prevented from moving at the time of fishline casting operation or the like so as to cause the intermediate gear to collide against the drag gear.

4 Claims, 7 Drawing Sheets

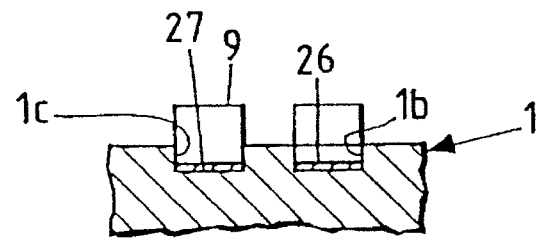
FIG. 7A
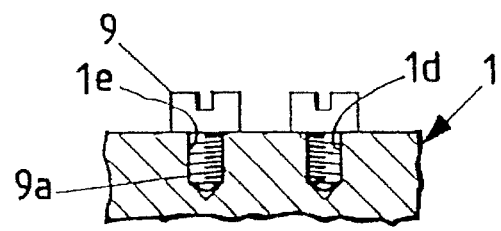
FIG. 7B
FIG. 8
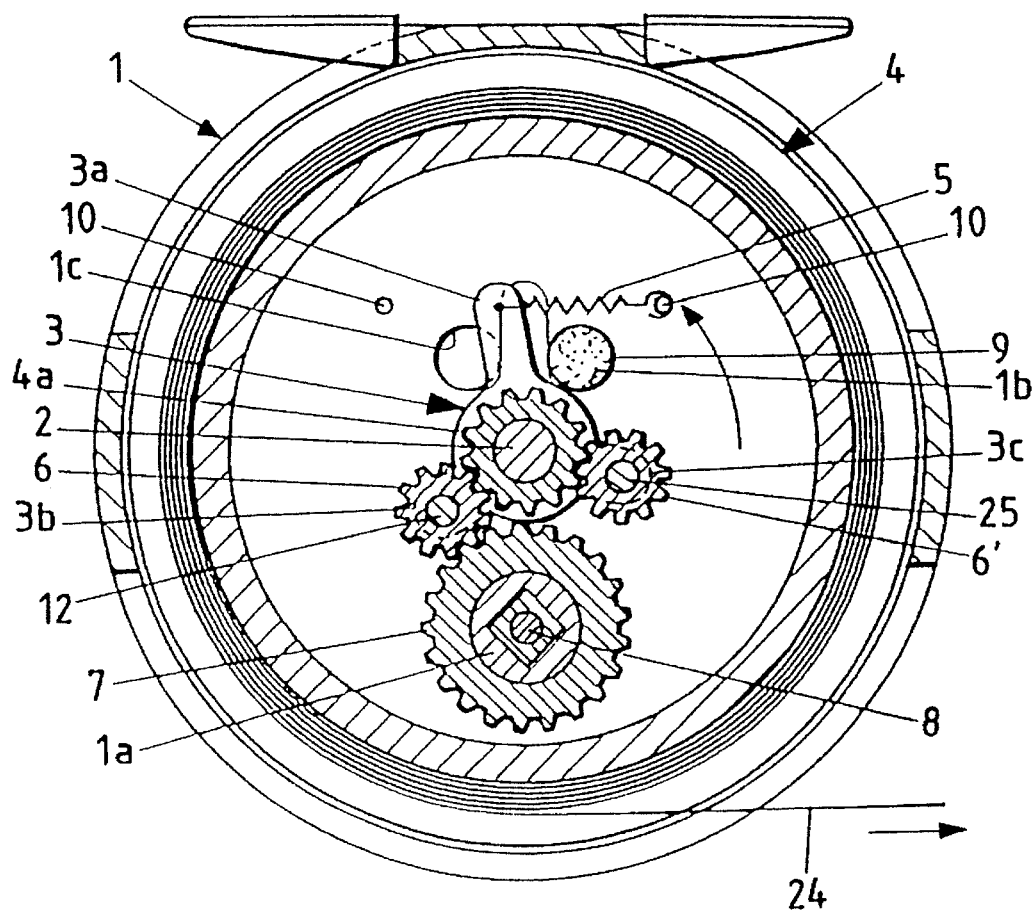

FISHING REEL

This is a continuation of application Ser. No. 08/063,703, filed May 20, 1993, now U.S. Pat. No. 5,393,006, issued Feb. 28, 1995.

BACKGROUND OF THE INVENTION

The present device relates to a fishing reel including a drag mechanism which does not act to a spool at the time of the rotation thereof in such a direction as to wind a fishline thereon, but automatically acts to the spool at the time of the rotation thereof in such a direction as to unwind the fishline therefrom.

A conventional fishing reel includes a one-way drag mechanism which does not act to a spool at the time of the rotation thereof in such a direction as to wind a fishline thereon, but automatically acts to the spool at the time of the rotation thereof in such a direction as to unwind the fishline therefrom, as disclosed in the Japan Utility Model Application (OPI) No. 22658/91 (the term "OPI" as used herein means an "unexamined published application"). In the drag mechanism, an intermediate gear coupled with a swing member, which is swung by a frictional force as the spool is rotated, is engaged with a gear which is rotated together with the spool, and the former gear is engaged with a drag gear at the time of the rotation of the spool in the fishline unwinding direction and disengaged from the drag gear at the time of the rotation of the spool in the fishline winding direction.

The swing member of the one-way drag mechanism of the conventional fishing reel moves due to the vertical swinging movement of the reel at the time of fishline casting operation so that the intermediate gear collides against the drag gear. This causes problems that a scratch or a flaw is made in the surface of each tooth of the gears to deteriorate the reel in rotation performance and life, and the reel makes an unpleasant clatter.

SUMMARY OF THE INVENTION

The present device was made in order to solve the above-mentioned problems. Accordingly, it is an object of the present device to provide a fishing reel having a simple construction to prevent a swing member from moving at the time of fishline casting operation or the like so as to cause a gear to collide against another gear to make a scratch or a flaw in the surface of each tooth of the gears and make a clatter, thereby improving the reel in rotation performance and life and preventing the reel from making the unpleasant noise.

In the fishing reel, a spool shaft is supported at one end thereof, and projects from the body of the reel. A spool is rotatably fitted on the shaft. A drive gear, which is rotated together with the spool, is engaged with an intermediate gear coupled with the swing member supported concentrically to the spool shaft so that the member is swingable. The intermediate gear is disposed near a drag gear supported by the body of the reel, and can be engaged with the drag gear. The reel is characterized in that a spring means urges the intermediate gear to engage it with the drag gear as the spool is rotated in such a direction as to unwind a fishline therefrom.

When the spool of the fishing reel provided in accordance with the present device is rotated clockwise, a clockwise swinging force acts to the swing member but the restriction arm thereof comes into contact with an engagement and stop pin at the right of the arm to restrict the clockwise swinging of the swing member to prevent the intermediate gear from being engaged with the drag gear. For that reason, the drag mechanism of the reel does not act to the spool to brake the rotation thereof. As a result, the spool is allowed to be lightly rotated only under the load of the fishline. When the spool is rotated counterclockwise because of the unwinding of the fishline therefrom, a counterclockwise swinging force acts to the swing member due to the rotation of the spool to swing the member counterclockwise to engage the intermediate gear with the drag gear so that the drag mechanism acts to the spool to brake the rotation thereof.

Since the spring means urges the swing member to put the restriction arm thereof in contact with the engagement and stop pin to restrict the swinging of the member to prevent the intermediate gear from colliding against the drag gear so as to make the scratch or the flaw in the surface of each tooth of the gears, the reel is improved in rotation performance and life and prevented from making the clatter.

BRIEF DESCRIPTION OF THE DRAWINGS

FIG. 1 is a sectional view of the reel along lines 1—1 shown in FIG. 2, and shows that the reel is built so as to rotate the spool thereof is rotated by the right hand of a fishing person;

FIG. 2 is a sectional view of the reel; and

FIG. 3 is a sectional view of the reel in the state that the spool is rotated in such a direction as to unwind a fishline therefrom.

FIGS. 7A and 7B are sectional views of the engagement and stop pin and engagement and stop screw of the reel shown in FIG. 6.

FIG. 8 is a sectional view of the reel in the state that the spool shown in FIG. 6 is rotated in such a direction as to unwind a fishline therefrom.

DETAILED DESCRIPTION OF THE PREFERRED EMBODIMENTS

Embodiments of the present device are hereafter described with reference to the drawings attached hereto.

Figure 1:
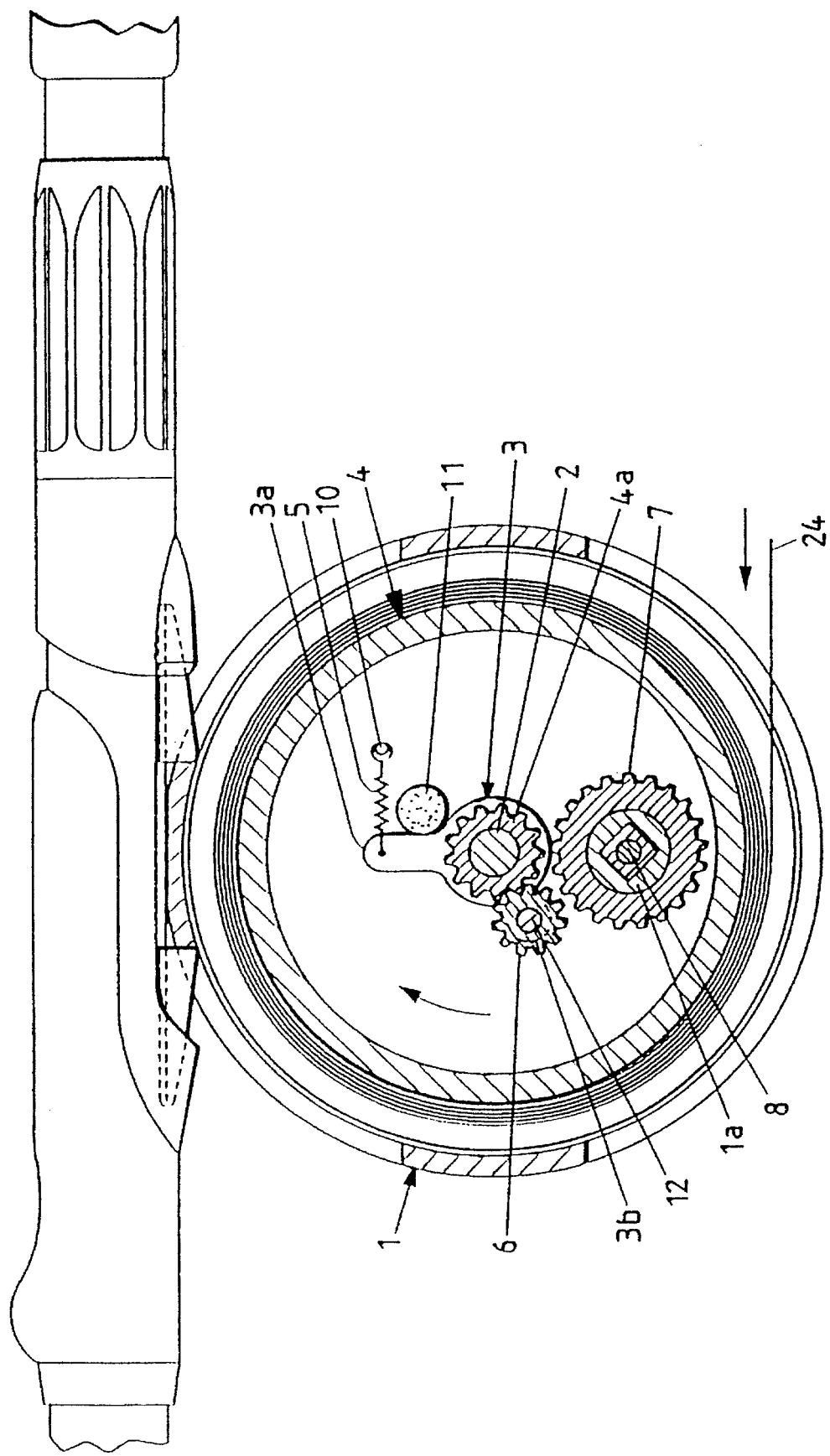
FIGS. 1, 2 and 3 show a fishing reel which is an embodiment of the present device and includes a spool shaft supported at one end thereof, where
Figure 2:
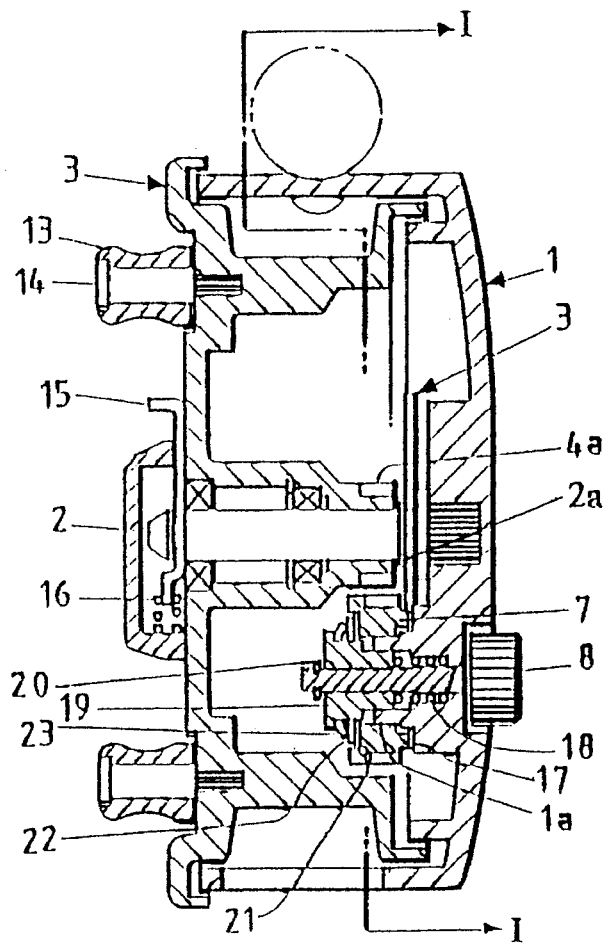
Figure 3:
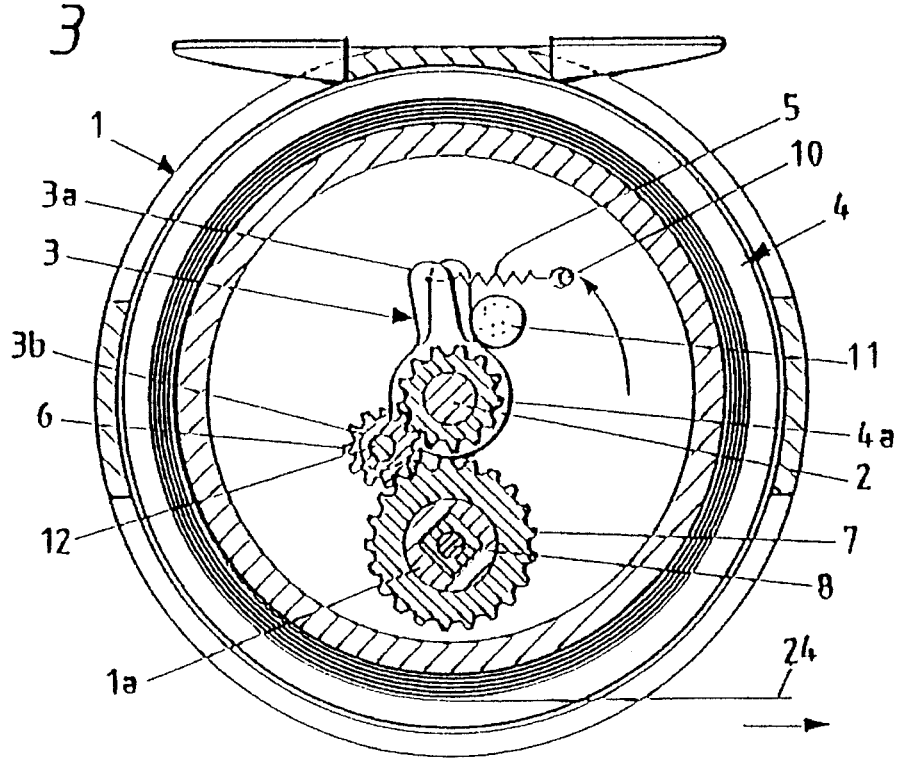

FIGS. 1, 2 and 3 show a fishing reel which is one of the embodiments and includes a spool shaft 2 supported at one end thereof. FIG. 1 is a sectional view of the reel along lines 1—1 shown in FIG. 2, and shows the reel in the state that it is built so as to rotate the spool 4 of the reel by the right hand of a fishing person. FIG. 2 is a sectional view of the reel. FIG. 3 is the same sectional view of the reel as shown in FIG. 1.

The fishing reel includes a body 1, the spool shaft 2, a swing member 3, the spool 4, a drive gear 4a, a spring 5, an intermediate gear 6, a drag gear 7, a drag screw 8, a pin 10, an engagement and stop pin 11, a shaft 12, a spool rotation knob 13, a knob shaft 14, an engagement plate 15, a spring 16, a friction plate 17, a helical spring 18, a drag member 19, an E-shaped ring 20, a friction plate 21, a drag plate 22, and a plate spring 23.

The spool shaft 2 is secured to the body 1 at the center thereof by press-fitting or the like, and projects from the inner surface of the body. The swing member 3 is supported by the shaft 2 so that the member is swingable. The spool 4 is rotatably fitted on the shaft 2. The spring 5 is strung between the long restriction arm 3a of the swing member 3 and the pin 10 implanted in the body 1, and urges the member 3 to put the arm 3a in contact with the engagement and stop pin 11 implanted in the body 1, to restrict the swinging of the member. The engagement and stop pin 11 may be removably fitted in either of holes as in another of the embodiments.

The swing member 3 has the long restriction arm 3a, and a short arm 3b to which the shaft 12 is secured. The intermediate gear 6 is rotatably fitted on the shaft 12.

The drive gear 4a is provided on the spool 4 so as to be rotated together therewith. The spool rotation knob 13 is rotatably fitted on the knob shaft 14 implanted in the side of the spool 4. The intermediate gear 6 is always engaged with the drive gear 4a. The engagement plate 15 is provided on the spool 4 at the center thereof to keep the spool in position removably on the spool shaft 2, and is urged by the spring 16.

The body 1 has a cylindrical portion 1a, on the peripheral surface of which the drag gear 7 is fitted. The friction plate 17 is pinched between one side of the drag gear 7 and the inner surface of the body. The drag screw 8 is inserted in the body 1 concentrically to the cylindrical portion 1a so that head of the screw is located as a knob in the outer surface of the body, and the shank of the screw extends through the cylindrical portion and is screw-engaged in the drag member 19. The helical spring 18 is fitted between the body 1 and the shank of the screw 8, and between the body and the drag member 19. The E-shaped ring 20 is fitted on the shank of the screw 8 at the tip of the shank to prevent the drag member 19 from coming off. The friction plate 21, the drag plate 22 and the plate spring 23 are fitted on the peripheral surface of the drag member 19 so that the friction plate is in pressure contact with the other side of the drag gear 7.

When the spool 4 is rotated clockwise with regard to FIG. 1 as shown by a curved arrow therein, a clockwise swinging force acts to the swing member 3 but the restriction arm 3a thereof comes into contact with the engagement and stop pin 11 to restrict the clockwise swinging of the swing member to prevent the intermediate gear 6 from being engaged with the drag gear 7. A washer 2a is mounted on the shaft 2 in order to frictionally couple the spool 4 to the swing member 3, thus providing the swinging force acting therebetween. As a result, the drag mechanism of the fishing reel does not act to the spool 4 to brake the rotation thereof. For that reason, the spool 4 is allowed to be lightly rotated only under the load of a fishline 24. When the spool 4 is rotated counterclockwise with regard to FIG. 3 because of the unwinding of the fishline 24 from the spool as shown by a curved arrow in the drawing, a counterclockwise swinging force acts to the swing member 3 due to the rotation of the spool so that the member is swung counterclockwise. As a result, the intermediate gear 6 is engaged with the drag gear 7. For that reason, the drag mechanism acts to the spool 4 to brake the counterclockwise rotation thereof.

Since the spring 5 urges the swing member 3 to put the restriction arm 3a thereof in contact with the engagement and stop pin 11 to restrict the swinging of the member to prevent the intermediate gear 6 from colliding against the drag gear 7 at the time of fishline casting operation or the like so as to make a scratch or a flaw in the surface of each tooth of the gears, the fishing reel is improved in rotation performance and life and prevented from making a clatter. Since the urging tensile force of the spring 5 is set to be weaker than the frictional swinging force which is generated at the time of the rotation of the spool 4 to swing the member 3, it can be properly swung.

Although the spool 4 is rotated by the right hand of the fishing person, the fishing reel may be built so as to place the components thereof in mirror-image-like reverse positions to rotate the spool by the left hand of the person.

Figure 4:
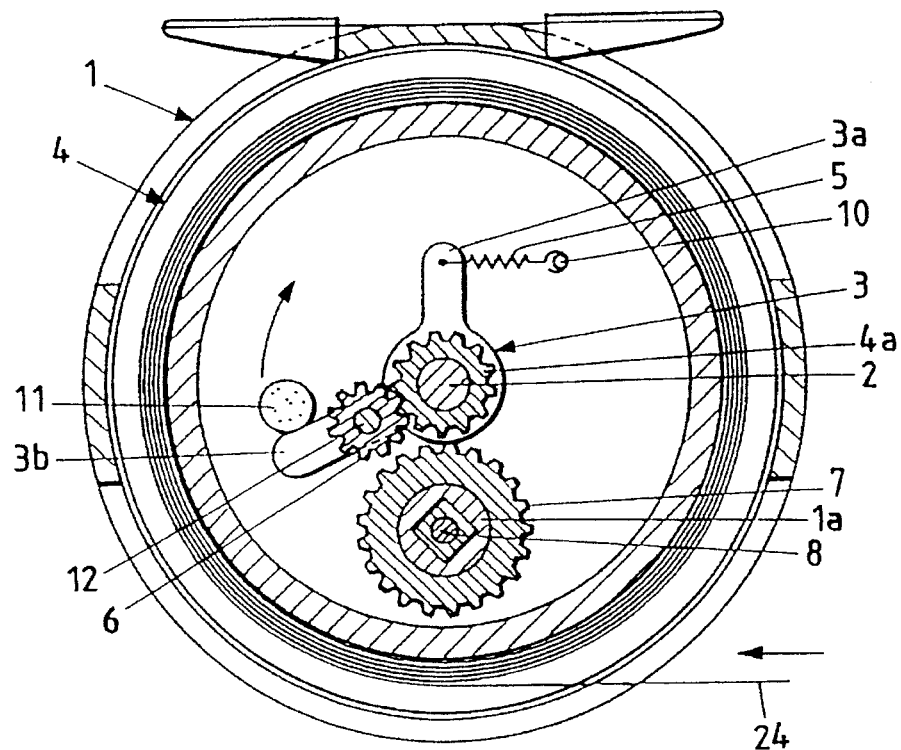
FIG. 4 is a sectional view of a fishing reel which is a modification of the embodiment and includes a spool shaft supported at one end thereof.

FIG. 4 is a sectional view of a fishing reel which is a modification of the preceding embodiment and includes a spool shaft 2 supported at one end thereof. The difference of the reel from the preceding one is that the reel includes a swing member 3 having two long restriction arms 3a and 3b, and a spring 5 is strung between one arm 3a and a pin 10 implanted in the body 1 of the reel, and urges the swing member to put the other arm 3b in contact with an engagement and stop pin 11 implanted in the body, to restrict the swinging of the member.

Figure 5:
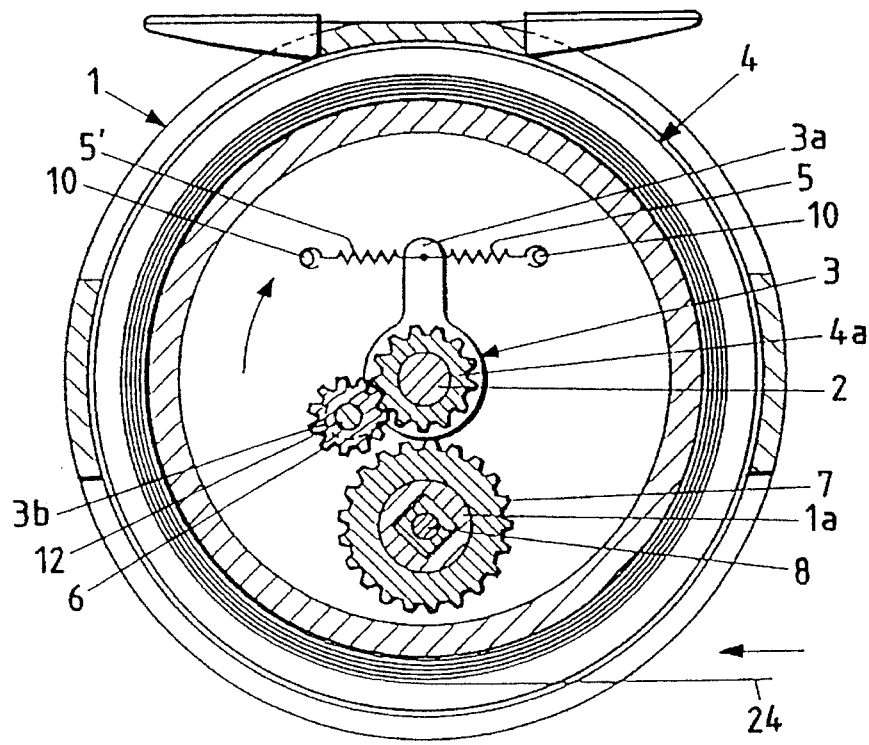
FIG. 5 is a sectional view of a fishing reel which is another modification of the embodiment and includes a spool shaft supported at one end thereof.

FIG. 5 is a sectional view of a fishing reel which is another modification of the preceding embodiment and includes a spool shaft 2 supported at one end thereof. The difference of the reel from that shown in FIGS. 1, 2 and 3 is that the reel does not include a restriction pin such as the engagement and stop pin 11, but includes two springs 5 and 5' which are strung between the long restriction arm 3a of a swing member 3 and two pins 10 implanted in the body 1 of the reel and located symmetrically to each other about the arm, and urge the swing member to put it in such a position as not to engage an intermediate gear 6 with a drag gear 7. It is preferable that the spring 5 is slightly stronger in urging tensile force than the other spring 5'.

Figure 6:
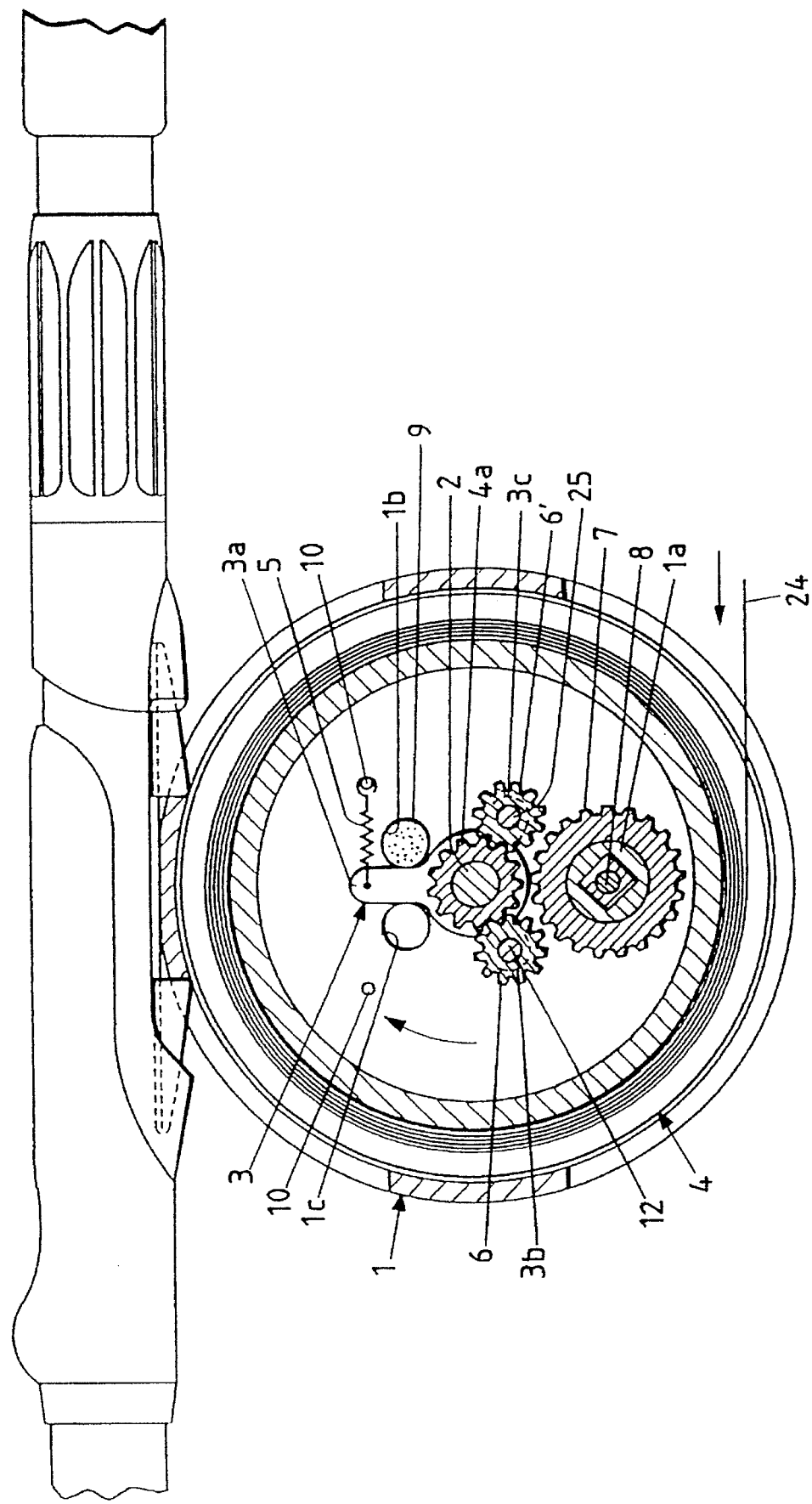
FIG. 6 is a sectional view of a fishing reel which is another embodiment of the device, includes a spool shaft supported at one end thereof, and can be either built so as to rotate the spool of the reel by the right hand of a fishing person, or built so as to rotate the spool by the left hand thereof, the reel shown in FIG. 6 being in the state that it is built so as to rotate the spool by the right hand of the person.
Figure 9:
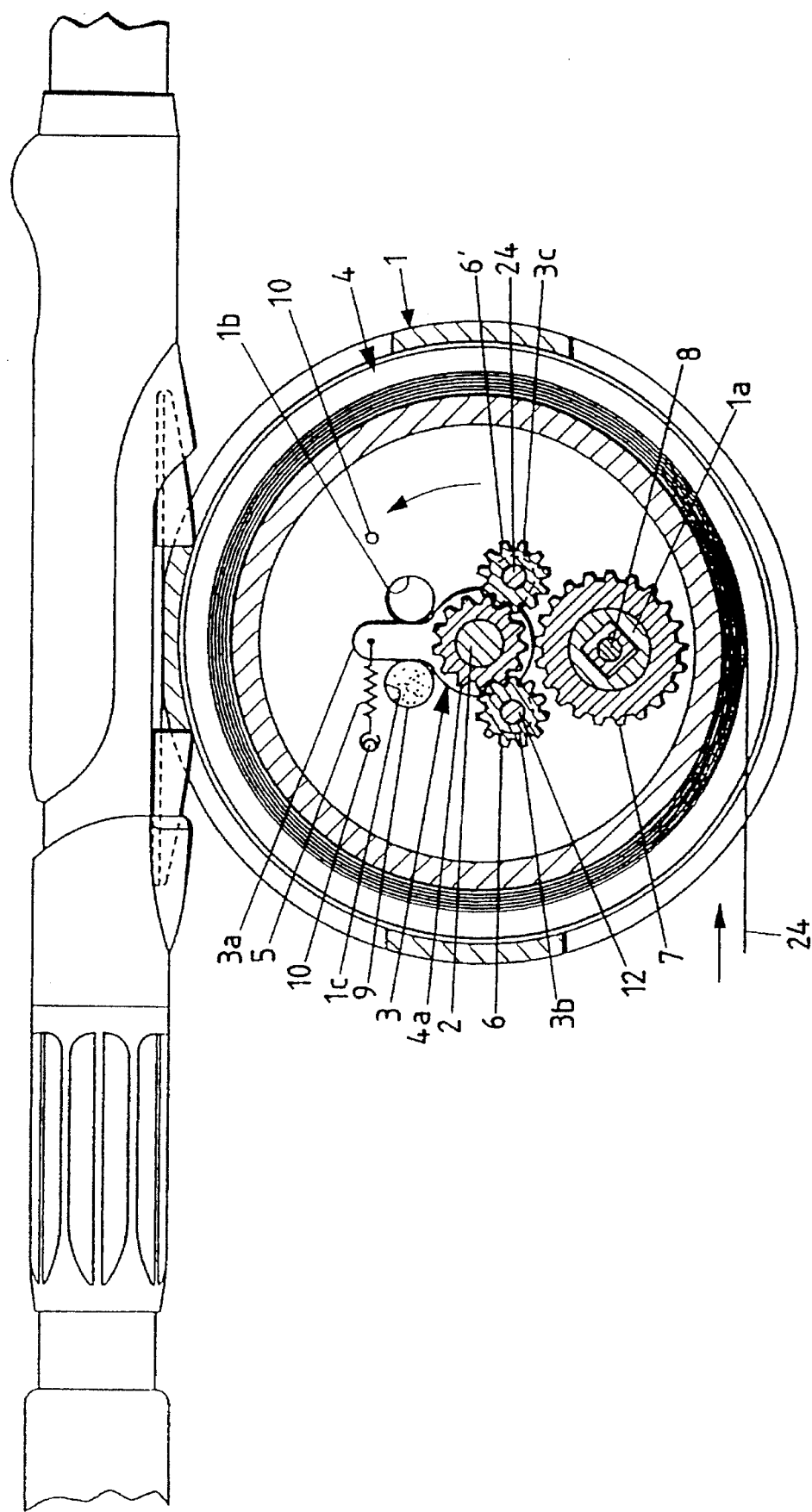
FIG. 9 is a sectional view of the reel shown in FIG. 6 in the state that it is built so as to rotate the spool by the left hand of the fishing person.
Figure 10:
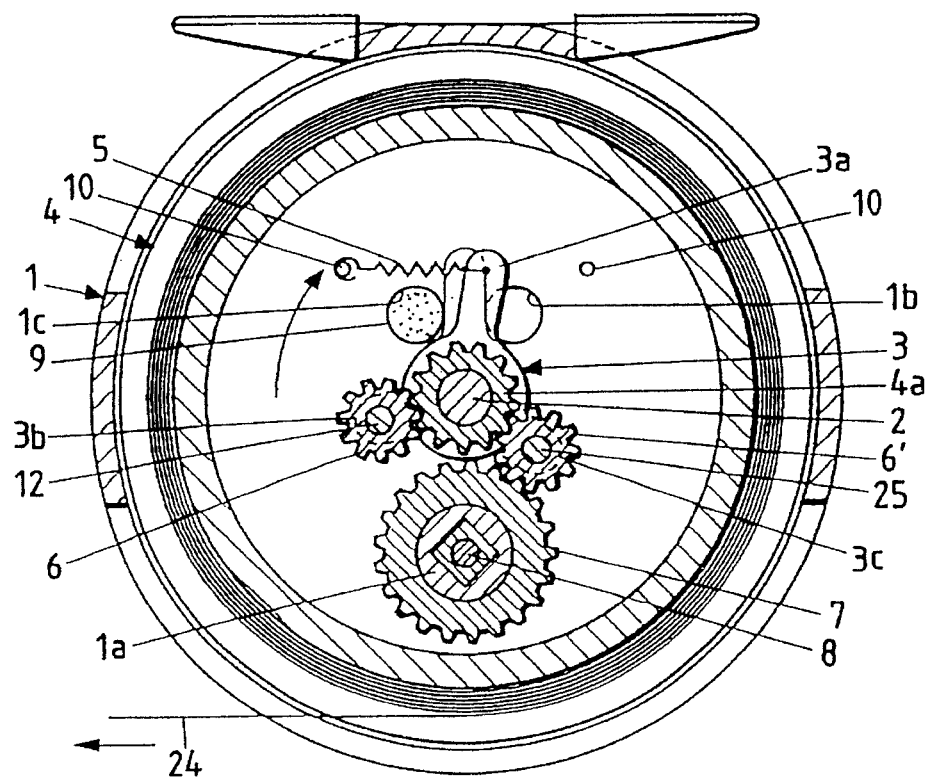
FIG. 10 is a sectional view of the reel shown in FIG. 9 in the state that the spool is rotated in such a direction as to unwind the fishline therefrom.

FIGS. 6, 7, 8, 9, 10 and 11 show a fishing reel which is another of the embodiments and includes a spool shaft 2 supported at one end thereof. The reel can be either built so as to rotate the spool 4 thereof by the right hand of a fishing person, or built so as to rotate the spool by the left hand thereof. FIG. 6 is a sectional view of the reel in the state that it is built so as to rotate the spool 4 by the right hand of the person. FIGS. 7A and 7B show the engagement and stop pin 9 of the reel and one modification thereof, respectively. FIG. 8 is a sectional view of the reel to illustrate the rotation of the spool 4 in such a direction as to unwind a fishline 24 therefrom. FIG. 9 is a sectional view of the reel in the state that it is built so as to rotate the spool 4 by the left hand of the person. FIG. 10 is a sectional view of the reel to illustrate the rotation of the spool 4 in such a direction as to unwind the fishline 24 therefrom. Since the reel has the preceding embodiment with regard to the part shown in FIG. 2, the reel is hereinafter described with reference to FIG. 2 as well.

The fishing reel includes a body 1, the spool shaft 2, a swing member 3, the spool 4, a drive gear 4a, a spring 5, intermediate gears 6 and 6', a drag gear 7, a drag screw 8, the engagement and stop pin 9, two pins 10, a shaft 12, a spool rotation knob 13, a knob shaft 14, an engagement plate 15, a spring 16, a friction plate 17, a helical spring 18, a drag member 19, an E-shaped ring 20, a friction plate 21, a drag plate 22, a plate spring 23, a shaft 25, and metal plates 26 and 27.

The spool shaft 2 is secured to the body 1 at the center thereof by press-fitting or the like, and projects from the inner surface of the body. The swing member 3 is supported by the spool shaft 2 so that the member is swingable. The spool 4 is rotatably fitted on the shaft 2. The spring 5 is strung between the long restriction arm 3a of the swing member 3 and one of the two pins 10 implanted in the body 1, and urges the swing member to put the arm in contact with the engagement and stop pin 9 attached to the body, to restrict the swinging of the member. The swing member 3 has the long restriction arm 3a, and two short arms 3b and 3c to which the shafts 12 and 25 are secured. The intermediate gears 6 and 6' are rotatably fitted on the shafts 12 and 25.

The body 1 has holes 1b and 1c located near the long restriction arm 3a of the swing member 3, as shown in FIG. 6 and FIG. 7A. The metal plates 26 and 27 for magnetic attraction are secured in the holes 1b and 1c at the bottoms thereof so that the engagement and stop pin 9 made of magnet is removably fitted in either one of the holes 1b and 1c. Tapped holes 1d and 1e and an engagement and stop screw 9 may be provided instead of the holes 1b and 1c and the engagement and stop pin 9, as shown in FIG. 7B. The screw 9 has a shank 9a to be engaged in one of the tapped holes 1d and 1e.

The drive gear 4a is provided on the spool 4 so as to be rotated together therewith. The shaft 14 is secured to the side of the spool 4. The spool rotation knob 13 is rotatably fitted on the shaft 14. The intermediate gears 6 and 6' are always engaged with the drive gear 4a. The engagement plate 15 is provided on the spool 4 at the center thereof to keep the spool in position removably on the spool shaft 2, and is urged by the spring 16.

The body 1 has a cylindrical portion 1a, on the peripheral surface of which the drag gear 7 is fitted so that the friction plate 17 is pinched between one side of the gear and the body. The drag screw 8 is inserted in the body 1 concentrically to the cylindrical portion 1a so that the head of the screw is located as a knob in the outer surface of the body, and the shank of the screw extends through the cylindrical portion and is screw-engaged in the drag member 19. The helical spring 18 is fitted between the body 1 and the shank of the screw 8, and between the body and the drag member 19. The E-shaped ring 20 is fitted on the shank of the screw 8 at the tip of the shank to prevent the drag member 19 from coming off. The friction plate 21, the drag plate 22 and the plate spring 23 are fitted on the peripheral surface of the drag member 19 so that the friction plate is in pressure contact with the other side of the drag gear 7.

If the fishing reel is built so as to rotate the spool 4 by the right hand of the fishing person, the engagement and stop pin 9 made of a magnet is fitted in the hole 1b of the body 1 at the right of the restriction arm 3a of the swing member 3 and the spring 5 is strung between the arm and one of the pins 10, as shown in FIGS. 6 and 8. When the spool 4 is then rotated clockwise with regard to FIG. 6 as shown by a curved arrow therein, to wind the fishline 24 on the spool, a clockwise swinging force acts to the swing member 3 but the restriction arm 3a thereof comes into contact with the engagement and stop pin 9 to restrict the clockwise swinging of the swing member to prevent both the intermediate gears 6 and 6' from being engaged with the drag gear 7. As a result, the drag mechanism of the reel does not act to the spool 4 to brake the rotation thereof. For that reason, the spool 4 is allowed to be lightly rotated only under the load of the fishline 24. When the spool 4 is rotated counterclockwise with regard to FIG. 8 because of the unwinding of the fishline 24 from the spool as shown by a curved arrow in the drawing, a counterclockwise swinging force acts to the swing member 3 due to the rotation of the spool so that the member is swing counterclockwise, because the engagement and stop pin 9 is not located at the left of the restriction arm 3a of the member. As a result, the intermediate gear 6 is engaged with the drag gear 7 so that the drag mechanism acts to the spool 4 to brake the counterclockwise rotation thereof.

If the reel is built so as to rotate the spool 4 by the left hand of the fishing person, the engagement and stop pin 9 made of the magnet is fitted in the other hole 1c of the body 1 at the left of the restriction arm 3a of the swing member 3 and the spring 5 is strung between the arm and the other pin 10, as shown in FIGS. 9 and 10. When the spool 4 is then rotated counterclockwise with regard to FIG. 9 as shown by a curved arrow therein, to wind the fishline 24 on the spool, a counterclockwise swinging force acts to the swing member 3 but the restriction arm 3a thereof comes into contact with the engagement and stop pin 9 to restrict the counterclockwise swinging of the swing member to prevent both the intermediate gears 6 and 6' from being engaged with the drag gear 7. As a result, the drag mechanism does not act to the spool 4 to brake the rotation thereof. For that reason, the spool 4 is allowed to be lightly rotated only under the load of the fishline 24. When the spool 4 is rotated clockwise with regard to FIG. 10 because of the unwinding of the fishline 24 from the spool as shown by a curved arrow in the drawing, a clockwise swinging force acts to the swing member 3 due to the rotation of the spool so that the member is swung clockwise because the engagement and stop pin 9 is not located at the right of the restriction arm 3a of the swing member. As a result, the intermediate gear 6' is engaged with the drag gear 7 so that the drag mechanism acts to the spool 4 to brake the clockwise rotation thereof.

Since the spring 5 urges the swing member 3 to put the restriction arm 3a thereof in contact with the engagement and stop pin 9 to restrict the swinging of the swing member to prevent the intermediate gears 6 and 6' from colliding against the drag gear 7 at the time of fishline casting operation or the like so as to make a scratch or a flaw in the surface of each tooth of the gears, the fishing reel is improved in rotation performance and life and prevented from making a clatter.

Figure 11:
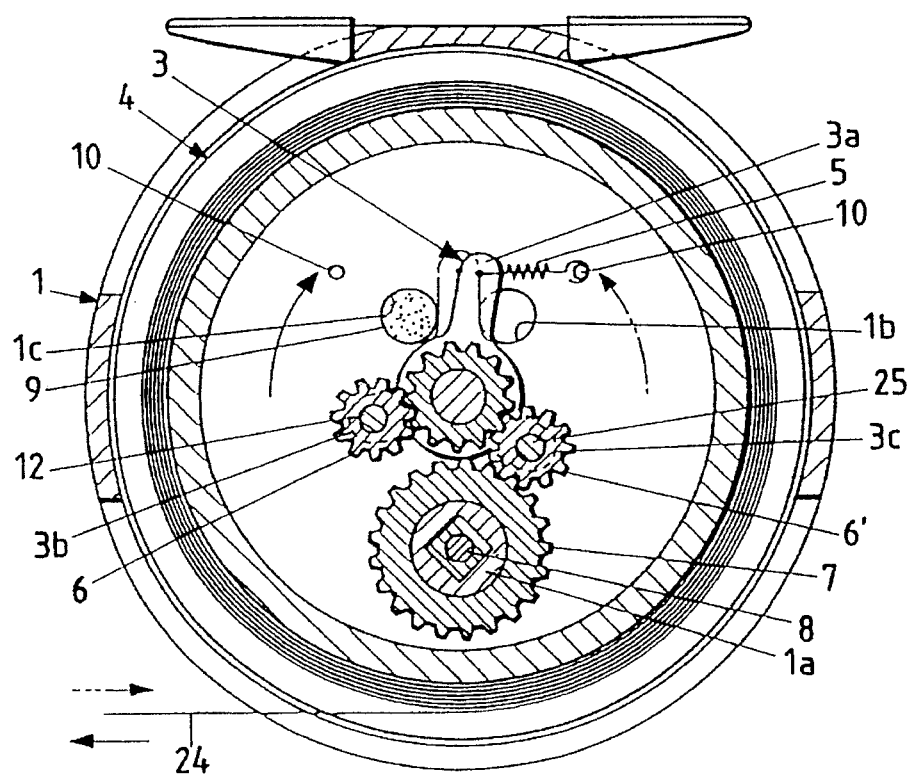
FIG. 11 is a sectional view of the reel in the state that a spring is disposed in the same position as the state shown in FIGS. 6 and 8, but the reel is built so as to rotate the spool by the left hand of the person.

FIG. 11 is a sectional view of the fishing reel in the state that the spring 5 is disposed in the same position as the state shown in FIGS. 6 and 8, but the reel is built so as to rotate the spool 4 by the left hand of the fishing person. In this state, the engagement and stop pin 9 made of the magnet is fitted in the left hole 1c of the body 1, and the spring 5 urges the swing member 3 clockwise with regard to FIG. 11 to usually engage the intermediate gear 6' with the drag gear 7. When the spool 4 is rotated counterclockwise with regard to FIG. 11 as shown by a curved dotted-line arrow therein, a counterclockwise swinging force acts to the swing member 3 but the restriction arm 3a thereof comes into contact with the engagement and stop pin 9 to restrict the counterclockwise swinging of the swing member, and the intermediate gear 6' is disengaged from the drag gear 7 so that the drag mechanism does not act to the spool 4 to brake the counterclockwise rotation thereof. For that reason, the spool 4 is allowed to be lightly rotated only under the load of the fishline 24. When the spool 4 is rotated clockwise with regard to FIG. 11 because of the unwinding of the fishline 24 as shown by a curved full-line arrow in FIG. 11, the intermediate gear 6' is engaged with the drag gear 7 so that the drag mechanism acts to the spool to quickly brake the clockwise rotation thereof.

Reversely to the state shown in FIG. 11, the reel may be built so that the spring 5 is disposed in the same position as the state shown in FIGS. 9 and 10, and the engagement and stop pin 9 is fitted in the right hole 1b, to use the reel to rotate the spool 4 by the right hand of the fishing person. As for this building, the intermediate gear 6 is usually engaged with the drag gear 7.

When the reel is built as shown in FIG. 11, the spring 5 urges the swing member 3 to restrict the swinging thereof to prevent the intermediate gears 6 and 6' from colliding against the drag gear 7 due to the vertical movement of the reel or the like at the time of fishline casting operation or the like so as to make a scratch or a flaw in the surface of each tooth of the gears. For that reason, the reel is improved in rotation performance and life and prevented from making a clatter.

Although each of the fishing reels is built so that the spool shaft 2 is supported at one end thereof, the present device may be embodied as a different fishing reel such as a fishing reel whose spool shaft is supported at both the ends thereof.

In a fishing reel provided in accordance with the present device, a spring urges a swing member to restrict the swinging thereof the prevent an intermediate gear from colliding against a drag gear due to the vertical movement of the reel or the like at the time of fishline casting operation or the like so as to make a scratch or a flaw in the surface of each tooth of the gears. For that reason, through a simple construction, the reel is improved in rotation performance and life and prevented from making a clatter. Desirable effects are thus produced.

What is claimed is:

1. A fishing reel, comprising:

a reel main body;

a spool rotatably supported on said reel main body and having a drive gear rotatable together with said spool about a spool axis;

a swing member swingably supported on said reel main body to pivot between a first and second position and having an intermediate gear rotatably mounted thereon in mesh with said drive gear, said intermediate gear rotating about an intermediate axis which pivots about said spool axis between said first and second positions;

a drag gear located so that said intermediate gear is brought into mesh with said drag gear at said second position through a swinging motion of said swing member; and a restriction means for urging said swing member toward said second position, and for permitting said swing member to be swung to said first position when said spool is rotated in a fishline winding direction, wherein said restriction means includes a spring provided between said swing member and said reel main body and a pin implanted in said reel main body, and wherein said swing member is resiliently urged toward said second position so as to engage said intermediate gear with said drag gear.

2. The fishing reel according to claim 1, wherein said pin implanted in said reel main body is magnetic, said pin magnetically attracting said swing member at said first position.

3. The fishing reel according to claim 1, wherein said reel main body has a support shaft projecting therefrom for rotatably supporting said spool on said reel main body and for swingingly supporting said swing member on said reel main body.

4. The fishing reel according to claim 1, wherein said spring is tensioned between said swing member and said reel main body.

* * * * *